United States Patent
Merriman et al.

(10) Patent No.: US 9,034,497 B2
(45) Date of Patent: May 19, 2015

(54) VEHICLE BATTERY PACK CONTAINER

(71) Applicants: Robert Merriman, Shelby Township, MI (US); Steven Lent, Canton, MI (US)

(72) Inventors: Robert Merriman, Shelby Township, MI (US); Steven Lent, Canton, MI (US)

(73) Assignee: LG Chem, Ltd., Seoul (KR)

( * ) Notice: Subject to any disclaimer, the term of this patent is extended or adjusted under 35 U.S.C. 154(b) by 455 days.

(21) Appl. No.: 13/625,993

(22) Filed: Sep. 25, 2012

(65) Prior Publication Data

US 2014/0087219 A1    Mar. 27, 2014

(51) Int. Cl.
*H01M 2/12* (2006.01)
*H01M 2/10* (2006.01)

(52) U.S. Cl.
CPC .............. *H01M 2/1252* (2013.01); *H01M 2/12* (2013.01); *H01M 2/1264* (2013.01); *H01M 2/1072* (2013.01); *H01M 2/1083* (2013.01); *H01M 2/1077* (2013.01); *H01M 2220/20* (2013.01)

(58) Field of Classification Search
None
See application file for complete search history.

(56) References Cited

U.S. PATENT DOCUMENTS

| 2,434,732 | A | * | 1/1948 | Alick | 408/241 R |
| 3,128,899 | A | * | 4/1964 | Runo | 220/374 |
| 5,505,041 | A | * | 4/1996 | Harlan | 53/473 |
| 2013/0157091 | A1 | * | 6/2013 | Gadawski | 429/82 |

OTHER PUBLICATIONS

Ismail, "Thermoplastic elastomers based on polypropylene/natural rubber and polypropylene/recycled rubber blends," 2002, Polymer Testing, 21, 389-395.*
U.S. Appl. No. 13/327,124, filed Dec. 15, 2011 entitled Vehicle Battery Pack Container.

* cited by examiner

*Primary Examiner* — Ula C Ruddock
*Assistant Examiner* — Matthew Van Oudenaren
(74) *Attorney, Agent, or Firm* — Buckert Patent & Trademark Law Firm, PC; John F. Buckert

(57) ABSTRACT

A vehicle battery pack container is provided. The container includes a base member, a peripheral wall coupled to the base member, and a cover member coupled to the peripheral wall. The container further includes a venting device having a venting housing and a flow diverter member disposed within an interior region of the venting housing. The venting housing is coupled to the base member and is in fluid communication with an aperture in the base member. The venting housing has a tubular portion and a first end portion having a plurality of apertures extending therethrough. The flow diverter member has a central shaft, a first flow diverter plate, and a second flow diverter plate.

15 Claims, 9 Drawing Sheets

VEHICLE BATTERY PACK CONTAINER

BACKGROUND

The inventors herein have recognized a need for an improved vehicle battery pack container configured to vent gases from a vehicle battery pack while preventing external fluids from entering the vehicle battery pack.

SUMMARY

A vehicle battery pack container in accordance with an exemplary embodiment is provided. The vehicle battery pack container includes a base member having an aperture extending therethrough. The vehicle battery pack container further includes a peripheral wall coupled to the base member. The vehicle battery pack container further includes a cover member coupled to the peripheral wall. The vehicle battery pack container further includes a venting device having a venting housing and a flow diverter member disposed within an interior region of the venting housing. The venting housing is configured to be coupled to the base member such that the venting device is in fluid communication with the aperture in the base member. The venting housing has a tubular portion and a first end portion coupled to an end of the tubular portion. The first end portion has a plurality of apertures extending therethrough. The flow diverter member has a central shaft, a first flow diverter plate, and a second flow diverter plate. The first flow diverter plate is coupled to and extends substantially perpendicular to the central shaft and is disposed at a first longitudinal position on the central shaft. The first flow diverter plate covers a portion of a cross-sectional area of the interior region at a plane that is coplanar with a top surface of the first flow diverter plate. The second flow diverter plate is coupled to and extends substantially perpendicular to the central shaft and is disposed at a second longitudinal position on the central shaft. The second flow diverter plate covers a portion of a cross-sectional area of the interior region at a second plane that is coplanar with a top surface of the second flow diverter plate, such that a fluid entering the plurality of apertures in the first end portion cannot flow directly through the tubular portion without contacting at least one of the first flow diverter plate and the second flow diverter plate.

DETAILED DESCRIPTION

Figure 1:
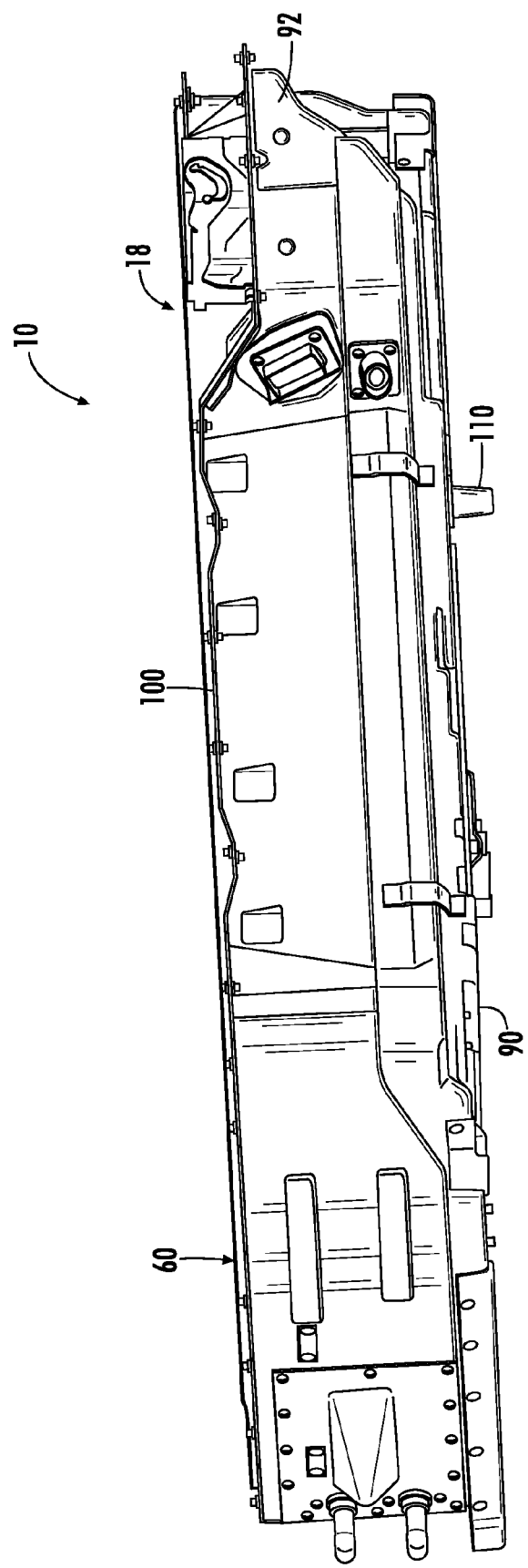
FIG. 1 is a schematic of a vehicle battery pack having a vehicle battery pack container in accordance with an exemplary embodiment.
Figure 2:
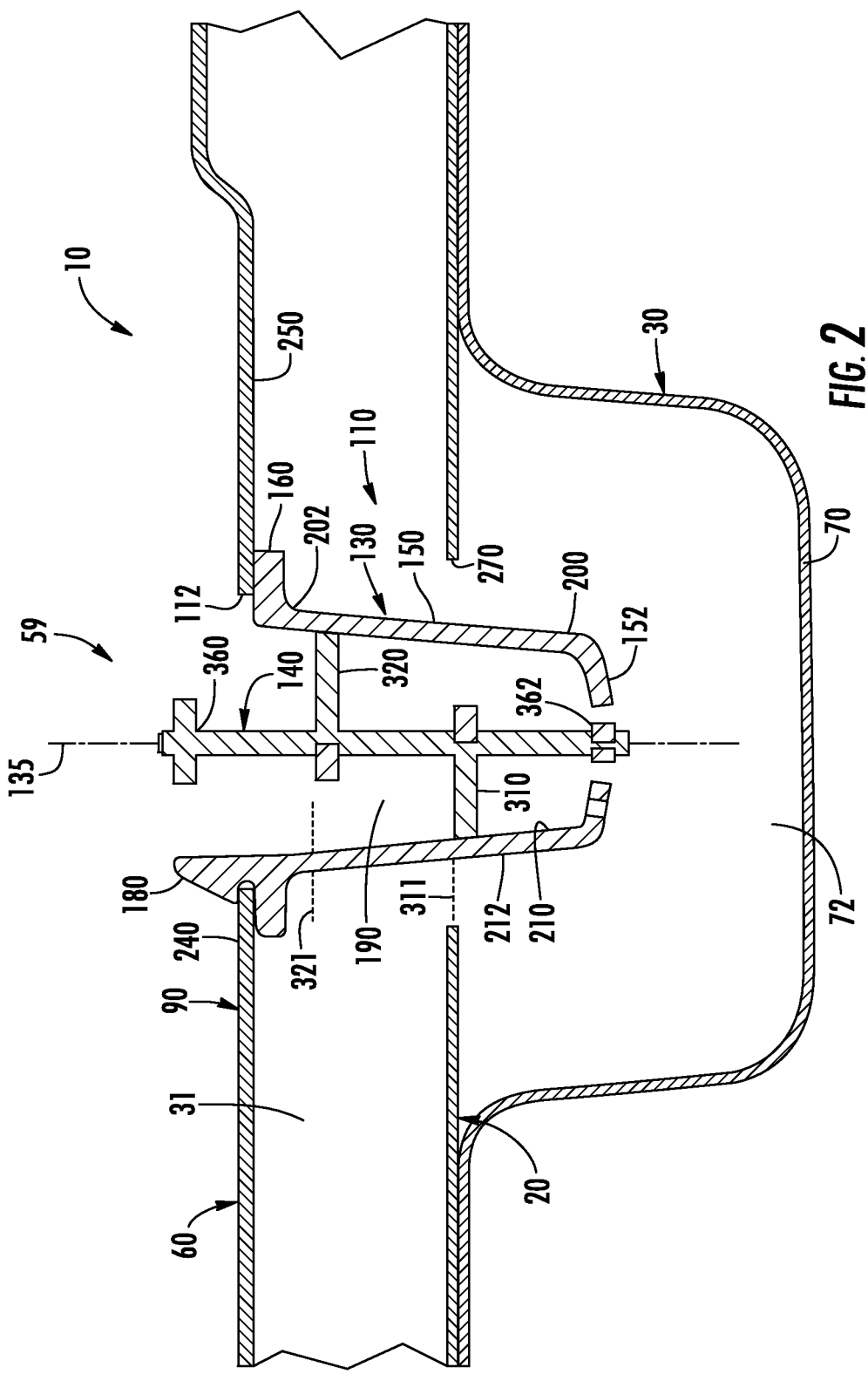
FIG. 2 is a cross-sectional schematic of a portion of a vehicle illustrating a portion of the vehicle battery pack container of FIG. 1 and a portion of a vehicle frame.
Figure 3:
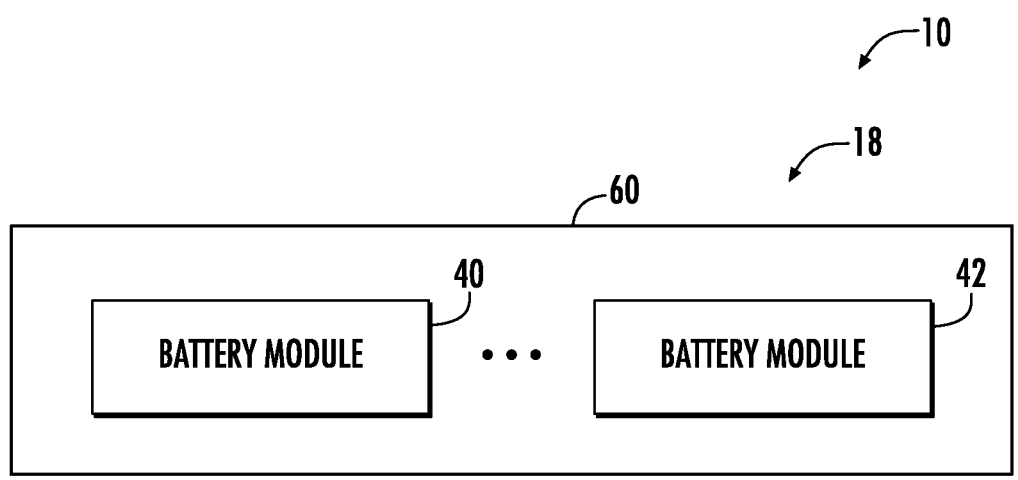
FIG. 3 is a block diagram of the vehicle battery pack of FIG. 1 having battery modules and the vehicle battery pack container.
Figure 4:
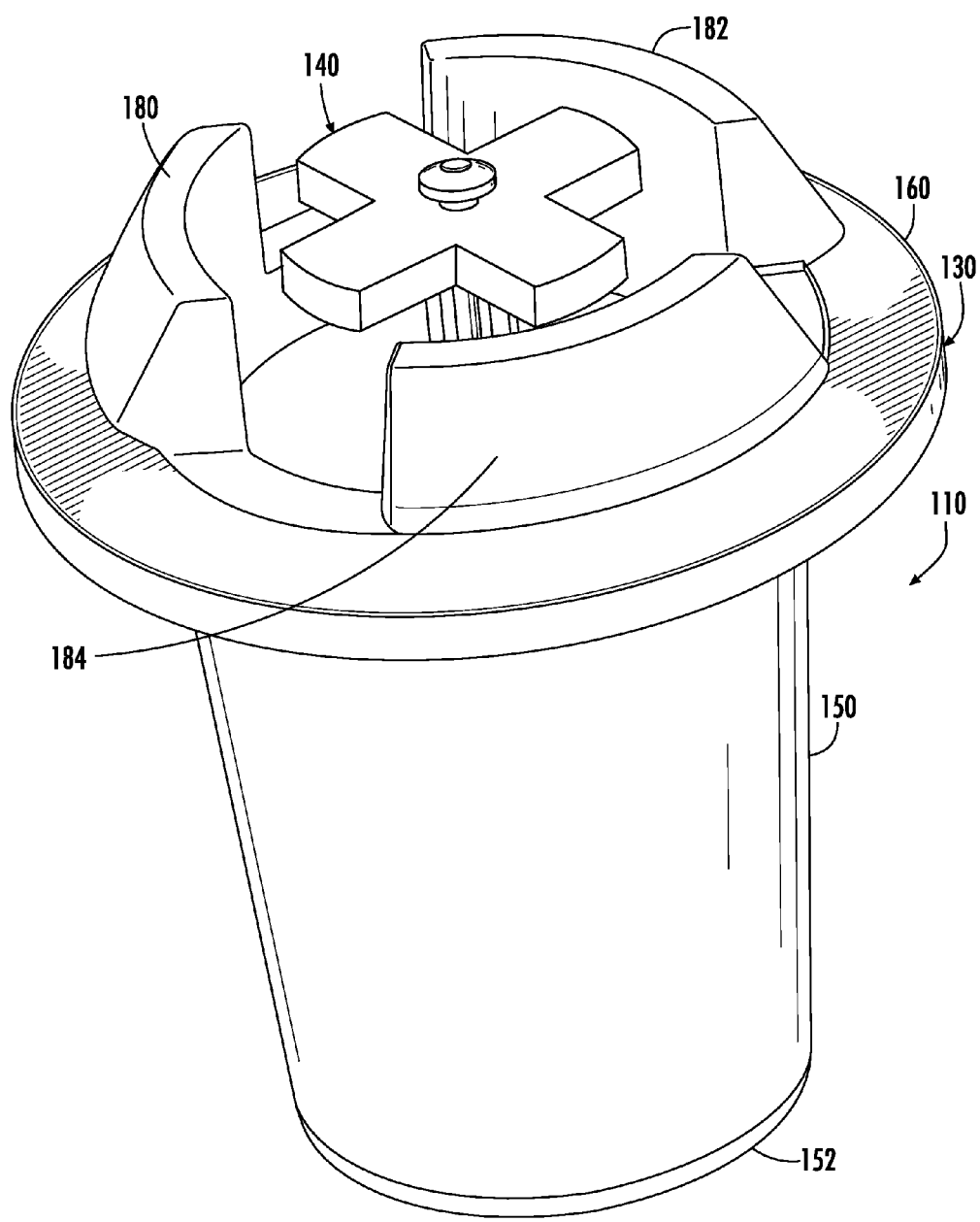
FIG. 4 is a schematic of a venting device coupled to a base portion of a vehicle battery pack container of FIG. 1 in accordance with another exemplary embodiment.
Figure 5:
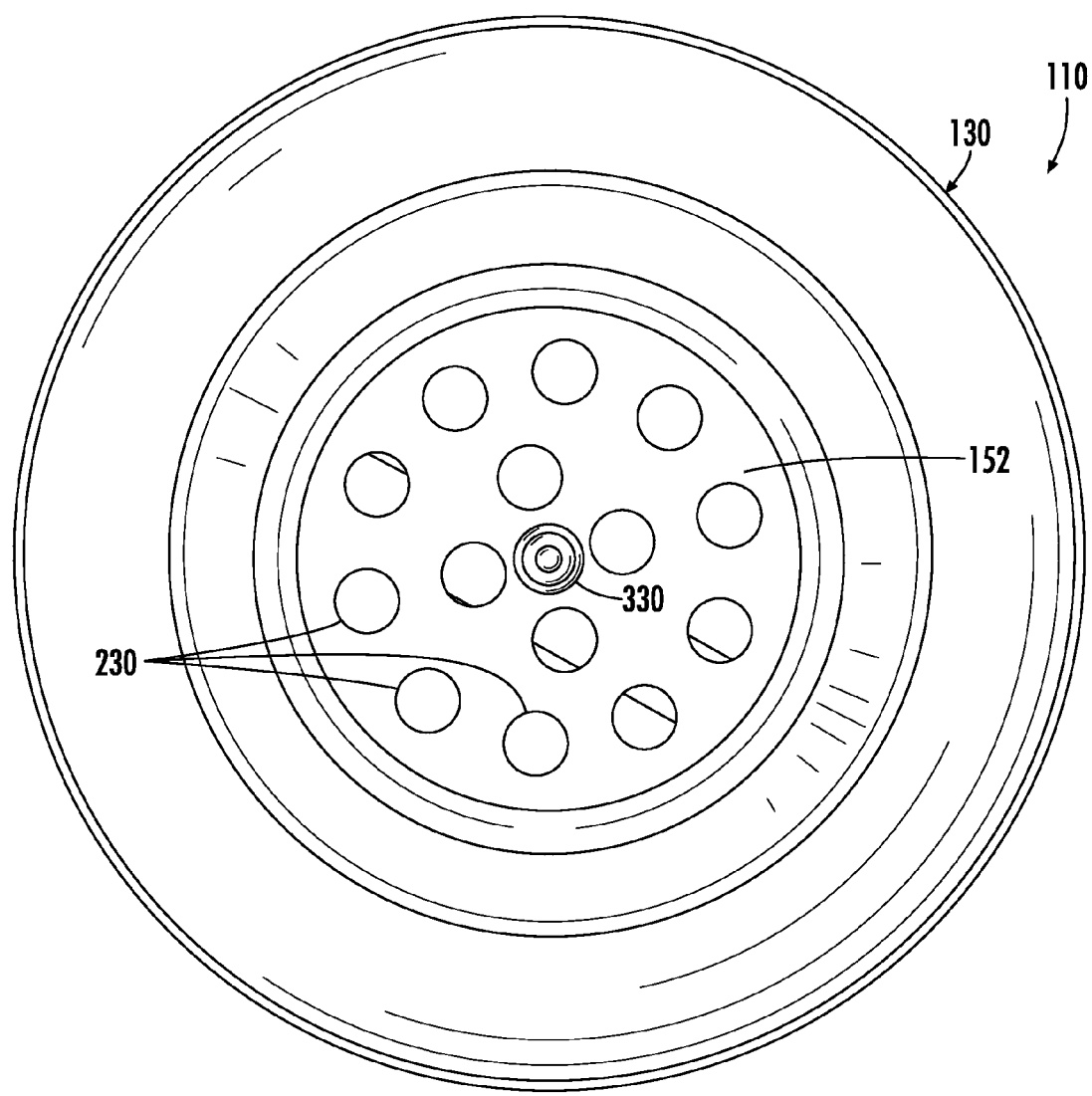
FIG. 5 is a schematic of a bottom portion of the venting device of FIG. 4.
Figure 6:
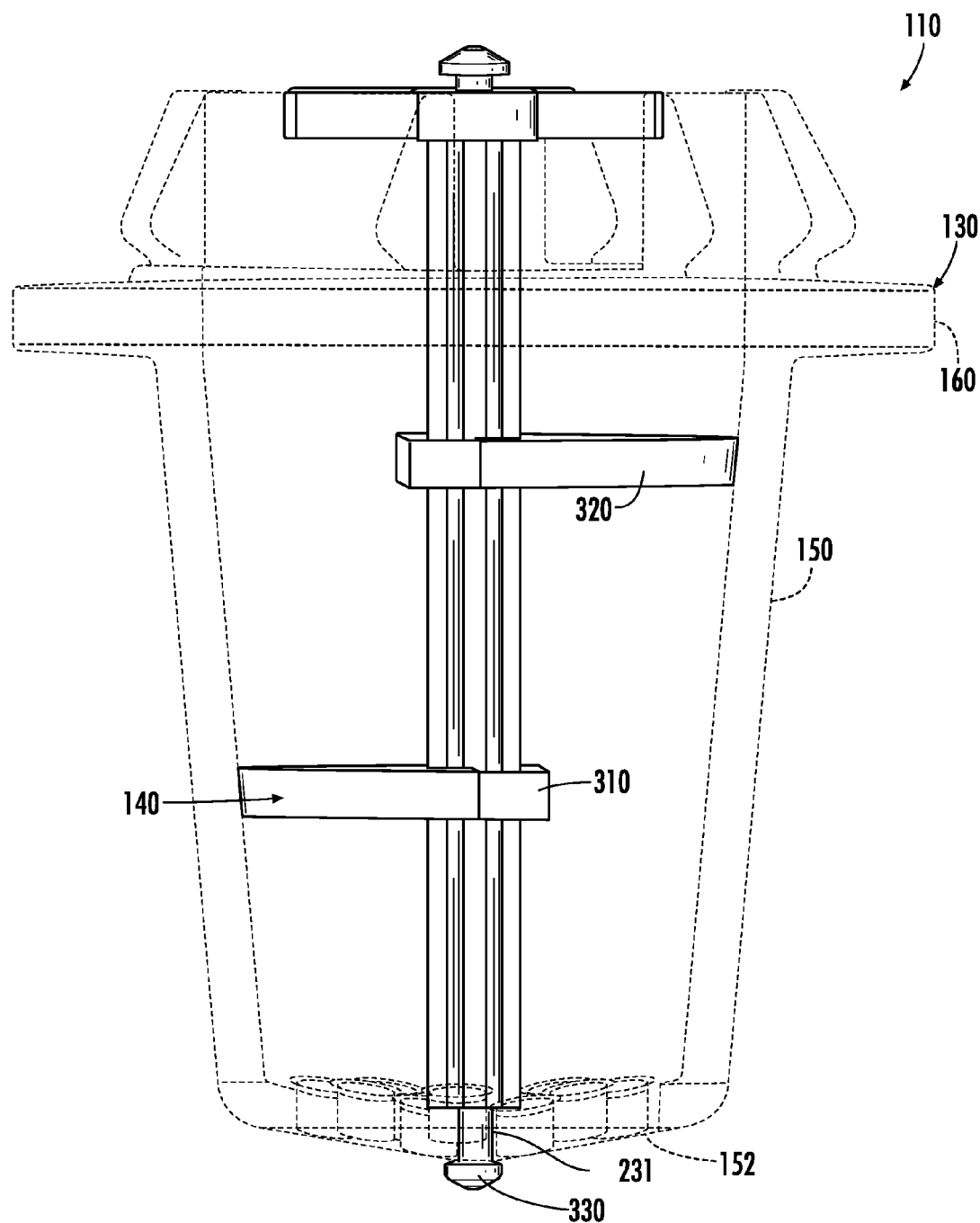
FIG. 6 is a schematic illustrating a venting housing and a flow diverter member of the venting device of FIG. 4.
Figure 7:
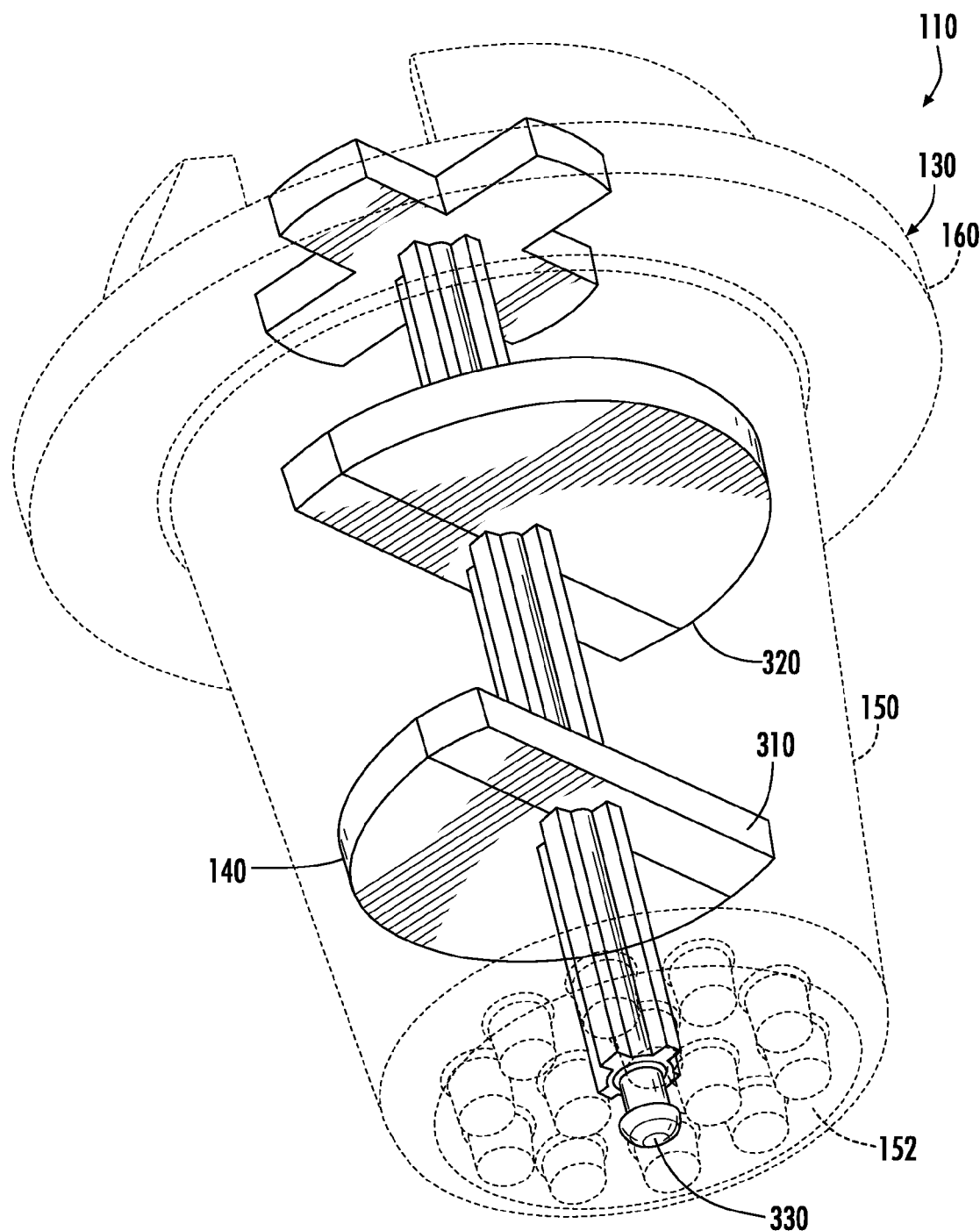
FIG. 7 is another schematic illustrating the venting housing and the flow diverter member of the venting device of FIG. 4.
Figure 8:
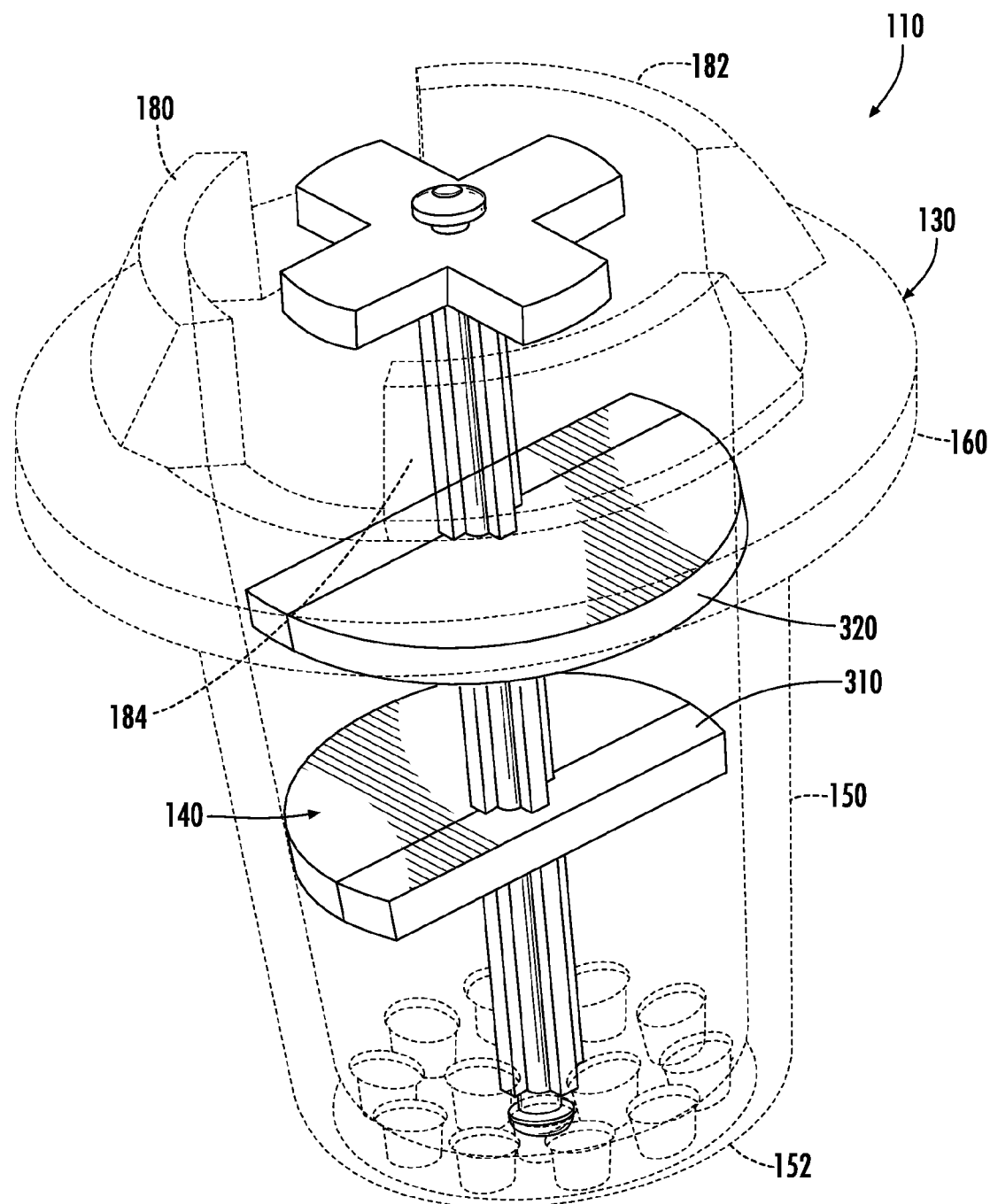
FIG. 8 is another schematic illustrating the vent housing and the flow diverter member of the venting device of FIG. 4.
Figure 9:
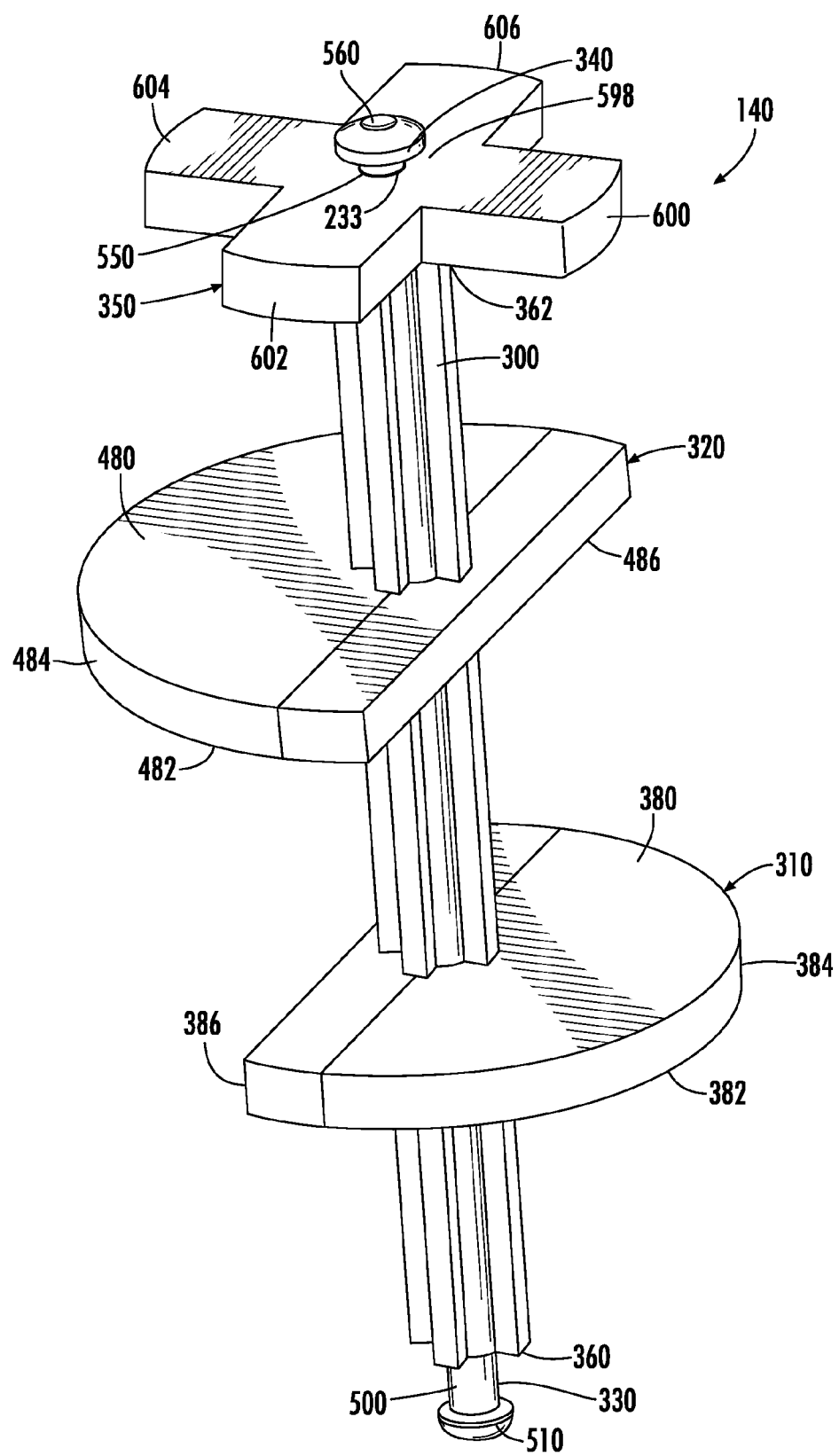
FIG. 9 is a schematic of the flow diverter member of FIG. 6.

Referring to FIGS. 1-3, a vehicle 10 having a vehicle battery pack 18 is provided. The vehicle 10 further includes a vehicle floor 20, a vehicle frame 30, and a foam gasket 31. The vehicle battery pack 18 includes battery modules 40, 42 and a vehicle battery pack container 60 in accordance with an exemplary embodiment. The vehicle battery pack container 60 holds the battery modules 40, 42 within an interior region defined by the container 60. As shown, the vehicle battery pack container 60 is disposed on the foam gasket 31 which is further disposed on the vehicle floor 20. The vehicle floor 20 is coupled to the vehicle frame 30. The vehicle frame 30 includes a vehicle frame member 70 that defines a region 72 which receives a portion of the venting device 110 therein.

The vehicle battery pack container 60 is provided to support and enclose the battery modules 40, 42 therein and to safely vent gases from the interior region 59 of the vehicle battery pack container 60 to the region 72 which communicates with ambient atmosphere. The vehicle battery pack container 60 includes a base member 90, a peripheral side wall 92, a cover member 100, and a venting device 110. The base member 90 includes an aperture 112 (shown in FIG. 2) extending therethrough. The peripheral side wall 92 is coupled to an outer periphery of the base member 90. The battery modules 40, 42 are disposed on the base member 90. The cover member 100 is disposed on a top portion of the peripheral side wall 92 to enclose the battery modules 40, 42 within the region 59 of the vehicle battery pack container 60. In one exemplary embodiment, the base member 90 and the peripheral side wall 92 are constructed of steel, and the cover member 100 is constructed of plastic. In an alternative embodiment, the base member 90, the peripheral side wall 92, and the cover member 100 could be constructed of other materials known to those skilled in the art.

Referring to FIGS. 2 and 4-9, the venting device 110 is provided to safely vent gases from the interior region 59 of the vehicle battery pack container 60 to ambient atmosphere while preventing external fluids from entering the interior region 59.

The venting device 110 includes a venting housing 130 and a flow diverter member 140 disposed within an interior region 190 of the venting housing 130. In one exemplary embodiment, the venting housing 130 is constructed of plastic and the flow diverter member 140 is constructed of an elastomeric material. In an alternative embodiment, the venting housing 130 and the flow diverter member 140 are both constructed of an elastomeric material. In other alternative embodiments, the venting housing 130 and the flow diverter member 140 could be constructed of other materials known to those skilled in the art.

The venting housing 130 has a tubular portion 150, a first end portion 152, a ring-shaped tab portion 160, and retaining tabs 180, 182, 184. The tubular portion 150 has a first end 200, a second end 202, an inner surface 210, and an outer surface 212. The tubular portion 150 is centered about a longitudinal axis 135.

The first end portion 152 is disposed at a first end 200 of the tubular portion 150 and encloses the first end 200. The first end portion 152 has a plurality of apertures 230 extending therethrough and an attachment aperture 231 (shown in FIG. 6) extending therethrough.

The ring-shaped tab portion 160 extends around the outer surface 212 of the tubular portion 150 at the second end 202 of the tubular portion 150 and further extends radially outwardly from the outer surface 212.

Referring to FIGS. 2 and 4-6, the retaining tabs 180, 182, 184 extend generally longitudinally from the second end 202 of the tubular portion 150. In one exemplary embodiment, the retaining tabs 180, 182, 184 are disposed equidistant from one another around a periphery of the second end 202. The retaining tabs 180, 182, 184 are configured to be received through the aperture 112 (shown in FIG. 2) of the base member 90 of the vehicle battery pack container 60. The retaining tabs 180, 182, 184 are held against a first surface 240 of the base member 90 and the ring-shaped tab portion 160 is held against a second surface 250 of the base member 90.

Referring to FIGS. 2 and 4-9, the flow diverter 140 is configured to contact any fluid entering through the plurality of apertures 230 in the first end portion 152 of the venting housing 130, such that the fluid thereafter flows downwardly through the apertures 230 and outside of the interior region 190 so that the fluid is prevented from entering the interior region 59 of the vehicle battery pack container 60. The flow diverter 140 includes a central shaft 300, a first flow diverter plate 310, a second flow diverter plate 320, tip attachment members 330, 340, and a handling member 350. In one exemplary embodiment, the flow diverter 140 is constructed of an elastomeric material such as rubber for example. Of course, in alternative embodiments, the flow diverter 140 could be constructed of other materials known to those skilled in the art such as plastic for example.

The central shaft 300 extends longitudinally along the longitudinal axis 135 and includes a first end 360 and a second end 362.

The first flow diverter plate 310 is coupled to and extends substantially perpendicular to the central shaft 300 and is disposed at a first longitudinal position on the central shaft 300. The first flow diverter plate 310 includes a top surface 380, a bottom surface 382, an arcuate-shaped side surface 384, and a flat side surface 386. The arcuate-shaped side surface 384 contacts the inner surface 210 of the tubular portion 150 of the venting housing 130. The first flow diverter plate 310 covers a portion of a cross-sectional area of an interior region 190 at a plane 311 that is coplanar with the top surface 380 of the first flow diverter plate 310. In particular, the first flow diverter plate 310 covers at least half of the cross-sectional area of the interior region 190 at the plane 311 that is coplanar with the top surface 380 of the first flow diverter plate 310.

The second flow diverter plate 320 is coupled to and extends substantially perpendicular to the central shaft 300 and is disposed at a second longitudinal position on the central shaft 300. The second flow diverter plate 320 includes a top surface 480, a bottom surface 482, an arcuate-shaped side surface 484, and a flat side surface 486. The arcuate-shaped side surface 484 contacts the inner surface 210 of the tubular portion 150 of the venting housing 130. The second flow diverter plate 320 covers a portion of a cross-sectional area of the interior region 190 at a second plane 321 that is coplanar with the top surface 480 of the second flow diverter plate 320. In particular, the second flow diverter plate 320 covers at least half of the cross-sectional area of the interior region 190 at the plane 321 that is coplanar with the top surface 480 of the second flow diverter plate 320.

A fluid entering the plurality of apertures 230 in the first end portion 152 cannot flow directly through the tubular portion 150 without contacting a bottom surface of at least one of the first flow diverter plate 310 and the second flow diverter plate 320.

Referring to FIGS. 5-7 and 9, the tip attachment member 330 is configured to be removably coupled to the first end portion 152 of the venting housing 130. The tip attachment member 330 includes a shaft portion 500 and a head portion 510 coupled to the shaft portion 500. The shaft portion 500 is further coupled to and extends longitudinally from the first end 360 of the central shaft 300. The head portion 510 and the shaft portion 500 are configured to be received through an attachment aperture 231 (shown in FIG. 6) extending through the first end portion 152 of the venting housing 130. The diameter of the head portion 510 is larger than a diameter of the attachment aperture 231 in the first end portion 152. In a desired installed position, when the head portion 510 is disposed through the attachment aperture 231 of the first end portion 152, the first end portion 152 is disposed and held between the head portion 510 and the first end 360 of the central shaft 300.

The tip attachment member 340 is configured to be removably coupled to the handling member 350. The tip attachment member 340 includes a shaft portion 550 and a head portion 560 coupled to the shaft portion 550. The shaft portion 500 is further coupled to and extends longitudinally from the second end 362 of the central shaft 300. The head portion 560 and the shaft portion 550 are configured to be received through an attachment aperture 233 extending through the handling member 350. The diameter of the head portion 560 is larger than a diameter of the attachment aperture 233 in the handling member 350. In a desired installed position, when the head portion 560 is disposed through the attachment aperture 233, the handling member 350 is disposed and held between the head portion 560 and the second end 362 of the central shaft 300.

The handling member 350 is provided to allow an operator to temporarily hold the handling member 350 to position the flow diverter 140 within the venting housing 130. The handling member 350 includes first, second, third, and fourth extension portions 600, 602, 604, 606 coupled to the central hub 598 and extending radially outwardly from the central hub 598, and further extending radially outwardly from the central shaft 300. The central hub 598 includes the aperture 233 extending therethrough for receiving the tip attachment member 340 therethrough. The handling member 350 is disposed between the head portion 560 and the second end 362 of the central shaft 300.

Referring to FIG. 2, the aperture 112 in the vehicle battery pack container 60 is aligned with an aperture 270 in the vehicle floor 20. As shown, the venting device 110 is coupled to the base member 90 proximate to the aperture 270 and extends downwardly through the aperture 270 of the vehicle floor 20. Thus, the second end 202 of the tubular portion 150 is disposed in the region 72 defined by the vehicle frame member 70. An advantage of positioning the venting device 110 within the region 72 is that vehicle frame member 70 deflects external dirt, fluids, and other debris away from the venting device 110.

The vehicle battery pack container claimed herein provides a substantial advantage over other vehicle battery pack containers. In particular, the claimed vehicle battery pack container utilizes a venting device that has a technical effect of preventing fluids and other materials from entering the vehicle battery pack container while allowing any exhausted gases from the battery pack to exit the vehicle battery pack container to ambient atmosphere.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A vehicle battery pack container, comprising:
   a base member having an aperture extending therethrough;
   a peripheral wall coupled to the base member;
   a cover member coupled to the peripheral wall;
   a venting device having a venting housing and a flow diverter member disposed within an interior region of the venting housing, the venting housing configured to be coupled to the base member such that the venting device is in fluid communication with the aperture in the base member, the venting housing having a tubular portion and a first end portion coupled to an end of the tubular portion, the first end portion having a plurality of apertures extending therethrough; and
   the flow diverter member having a central shaft, a first flow diverter plate, and a second flow diverter plate;
   the first flow diverter plate being coupled to and extending substantially perpendicular to the central shaft and being disposed at a first longitudinal position on the central shaft, the first flow diverter plate covering a portion of a cross-sectional area of the interior region at a plane that is coplanar with a top surface of the first flow diverter plate; and
   the second flow diverter plate being coupled to and extending substantially perpendicular to the central shaft and being disposed at a second longitudinal position on the central shaft, the second flow diverter plate covering a portion of a cross-sectional area of the interior region at a second plane that is coplanar with a top surface of the second flow diverter plate, such that a fluid entering the plurality of apertures in the first end portion cannot flow directly through the tubular portion without contacting at least one of the first flow diverter plate and the second flow diverter plate.

2. The vehicle battery pack container of claim 1, wherein the flow diverter member further includes a tip attachment member coupled to a first end of the central shaft, the tip attachment member configured to be removably coupled to the first end portion of the venting housing.

3. The vehicle battery pack container of claim 2, wherein the tip attachment member includes a shaft portion and a head portion attached to the shaft portion, the shaft portion coupled to and extending longitudinally from the first end of the central shaft.

4. The vehicle battery pack container of claim 3, wherein the shaft portion has a diameter that is less a diameter of the head portion.

5. The vehicle battery pack container of claim 3, wherein the head portion is configured to extend through an attachment aperture extending through the first end portion of the venting housing.

6. The vehicle battery pack container of claim 2, wherein the flow diverter member further includes a handling member disposed on a second end of the central shaft.

7. The vehicle battery pack container of claim 6, wherein the handling member includes first, second, third, and fourth extension portions extending radially outwardly from the central shaft.

8. The vehicle battery pack container of claim 1, wherein the venting housing is constructed of plastic and the flow diverter member is constructed of an elastomeric material.

9. The vehicle battery pack container of claim 1, wherein the venting housing further includes a ring-shaped tab portion extending around an outer surface of the tubular portion at a second end of the tubular portion and further extends radially outwardly from the outer surface.

10. The vehicle battery pack container of claim 9, wherein the venting housing further includes first and second retaining tabs extending generally longitudinally from the second end of the tubular portion.

11. The vehicle battery pack container of claim 10, wherein the first and second retaining tabs are configured to be received through the aperture of the base member such that the first and second retaining tabs are held against a first surface of the vehicle battery pack container and the ring-shaped tab portion is held against a second surface of the vehicle battery pack container.

12. The vehicle battery pack container of claim 1, wherein the venting device is disposed within a region at least partially enclosed by a vehicle frame member.

13. The vehicle battery pack container of claim 1, wherein the first flow diverter plate covers at least half of the cross-sectional area of the interior region at the plane that is coplanar with the top surface of the first flow diverter plate.

14. The vehicle battery pack container of claim 13, wherein the second flow diverter plate covers at least half of the cross-sectional area of the interior region at the plane that is coplanar with the top surface of the second flow diverter plate.

15. A vehicle battery pack container, comprising:
   a base member having an aperture extending therethrough;
   a peripheral wall coupled to the base member;
   a cover member coupled to the peripheral wall;
   a venting device having a venting housing and an elastomeric flow diverter member disposed within an interior region of the venting housing, the venting housing configured to be coupled to the base member such that the venting device is in fluid communication with the aperture in the base member, the venting housing having a tubular portion and a first end portion coupled to an end of the tubular portion, the first end portion having a plurality of apertures extending therethrough; and
   the elastomeric flow diverter member having a central shaft, a tip attachment member, a first flow diverter plate, and a second flow diverter plate;
   the first flow diverter plate being coupled to and extending substantially perpendicular to the central shaft and being disposed at a first longitudinal position on the central shaft, the first flow diverter plate covering a portion of a cross-sectional area of the interior region at a plane that is coplanar with a top surface of the first flow diverter plate;
   the second flow diverter plate being coupled to and extending substantially perpendicular to the central shaft and being disposed at a second longitudinal position on the central shaft, the second flow diverter plate covering a portion of a cross-sectional area of the interior region at a second plane that is coplanar with a top surface of the second flow diverter plate, such that a fluid entering the plurality of apertures in the first end portion cannot flow directly through the tubular portion without contacting at least one of the first flow diverter plate and the second flow diverter plate; and
   the tip attachment member coupled to a first end of the central shaft, the tip attachment member configured to be removably coupled to the first end portion of the venting housing; the tip attachment member having a shaft portion and a head portion attached to the shaft portion, the shaft portion coupled to and extending longitudinally from the first end of the central shaft, the shaft portion having a diameter that is less a diameter of the head portion, the head portion adapted to extend through an attachment aperture extending through the first end portion of the venting housing, the diameter of the head portion being greater than a diameter of the attachment aperture.

* * * * *